United States Patent
Lee et al.

(10) Patent No.: US 12,361,915 B2
(45) Date of Patent: Jul. 15, 2025

(54) DISPLAY DEVICE AND METHOD FOR DISPLAYING AN IMAGE THEREON

(71) Applicant: SAMSUNG DISPLAY CO., LTD., Yongin-si (KR)

(72) Inventors: Kang Hee Lee, Yongin-si (KR); Seung Ho Park, Yongin-si (KR); Chai Hoon Lim, Yongin-si (KR); Mi Young Joo, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/412,340

(22) Filed: Jan. 12, 2024

(65) Prior Publication Data

US 2024/0153471 A1    May 9, 2024

Related U.S. Application Data

(63) Continuation of application No. 17/833,770, filed on Jun. 6, 2022, now Pat. No. 11,922,905, which is a (Continued)

(30) Foreign Application Priority Data

Jan. 28, 2016   (KR) .................. 10-2016-0010815

(51) Int. Cl.
| | |
|---|---|
| *G09G 5/38* | (2006.01) |
| *G06T 3/20* | (2006.01) |
| *G09G 3/00* | (2006.01) |
| *G09G 3/3225* | (2016.01) |
| *G09G 3/3233* | (2016.01) |

(52) U.S. Cl.
CPC .............. *G09G 5/38* (2013.01); *G06T 3/20* (2013.01); *G09G 3/007* (2013.01); *G09G 3/3225* (2013.01);
(Continued)

(58) Field of Classification Search
None
See application file for complete search history.

(56) References Cited

U.S. PATENT DOCUMENTS

| | | |
|---|---|---|
| 7,990,400 B2 | 8/2011 | Hara |
| 9,449,548 B2 | 9/2016 | Shin |

(Continued)

FOREIGN PATENT DOCUMENTS

| | | |
|---|---|---|
| CN | 101183295 A | 5/2008 |
| CN | 101183518 A | 5/2008 |

(Continued)

OTHER PUBLICATIONS

Chinese Office Action dated Feb. 10, 2021, issued in corresponding Chinese Patent Application No. 201710061750.3 (13 pages).

*Primary Examiner* — Tapas Mazumder
(74) *Attorney, Agent, or Firm* — Womble Bond Dickinson (US) LLP

(57) ABSTRACT

In an embodiment of the present invention, a method for displaying an image of a display device includes moving the image displayed on an image display region along a movement path including a first position and a second position during a period of time, wherein, during the period of time, a total time for which the image is located at the first position is greater than a total time for which the image is located at the second position.

15 Claims, 12 Drawing Sheets

Related U.S. Application Data continuation of application No. 17/027,593, filed on Sep. 21, 2020, now Pat. No. 11,355,090, which is a continuation of application No. 16/175,655, filed on Oct. 30, 2018, now Pat. No. 10,783,855, which is a continuation of application No. 15/365,829, filed on Nov. 30, 2016, now Pat. No. 10,147,401.

(52) U.S. Cl.
CPC ... *G09G 3/3233* (2013.01); *G09G 2320/0257* (2013.01); *G09G 2320/046* (2013.01); *G09G 2320/106* (2013.01)

(56) References Cited

U.S. PATENT DOCUMENTS

| | | |
|---|---|---|
| 2004/0051705 A1 | 3/2004 | Lee |
| 2005/0204313 A1 | 9/2005 | Enoki et al. |
| 2008/0111886 A1 | 5/2008 | Bai |
| 2011/0134316 A1 | 6/2011 | Oguchi et al. |
| 2012/0236040 A1 | 9/2012 | Eom et al. |
| 2015/0077406 A1* | 3/2015 | Lee .................. G09G 3/007 345/204 |
| 2015/0154910 A1 | 6/2015 | Okuno et al. |
| 2016/0267627 A1 | 9/2016 | Nakai |
| 2017/0221455 A1 | 8/2017 | Lee et al. |

FOREIGN PATENT DOCUMENTS

| | | |
|---|---|---|
| CN | 102243840 A | 11/2011 |
| CN | 102467865 A | 5/2012 |
| CN | 102903346 A | 1/2013 |
| EP | 1720148 A2 | 11/2006 |
| KR | 10-0451745 B1 | 3/2004 |
| KR | 10-0551052 B1 | 5/2005 |

* cited by examiner

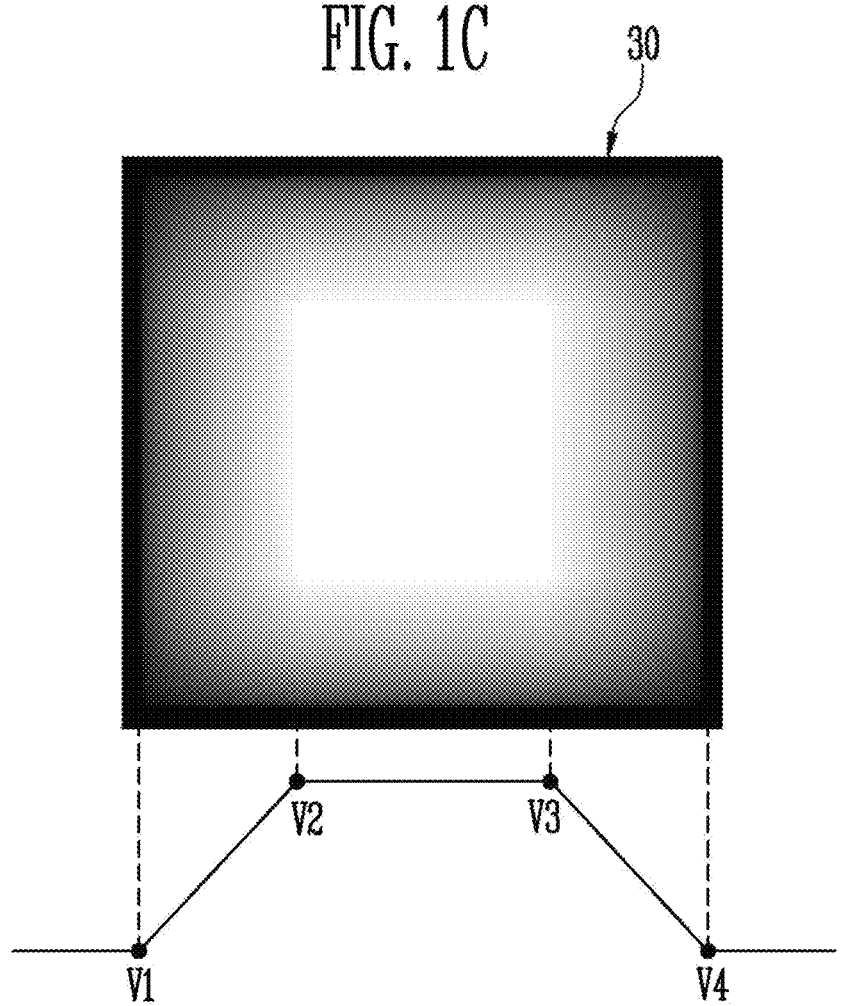

FIG. 12

| | SD |
|---|---|
| 1 | → |
| 2 | ↓ |
| 3 | ← |
| 4 | ← |
| 5 | ↑ |
| ⋮ | ⋮ |

LUT

DISPLAY DEVICE AND METHOD FOR DISPLAYING AN IMAGE THEREON

CROSS-REFERENCE TO RELATED APPLICATIONS

This application is a continuation of U.S. application Ser. No. 17/833,770 filed Jun. 6, 2022, which is a continuation of U.S. application Ser. No. 17/027,593 filed Sep. 21, 2020, which is a continuation of U.S. application Ser. No. 16/175,655 filed Oct. 30, 2018, now U.S. Pat. No. 10,783,855, which is a continuation of U.S. application Ser. No. 15/365,829 filed Nov. 30, 2016, now U.S. Pat. No. 10,147,401, which claims priority to and the benefit of Korean Patent Application No. 10-2016-0010815, filed on Jan. 28, 2016 in the Korean Intellectual Property Office, the entire content of all of which is incorporated herein by reference.

BACKGROUND

1. Field

Embodiments of the present invention relate to a display device, and a method for displaying an image thereon.

2. Description of the Related Art

Recently, various types of display devices have been used. Examples of such display devices include organic light emitting display devices, liquid crystal display devices, and plasma display devices. However, in such display devices, a pixel may deteriorate as a driving time increases, which degrades the function thereof. For example, in the case of a display device that continuously outputs a same image for a long period of time, pixel deterioration may be accelerated, such that image sticking may occur.

To solve the problem described above, technology for displaying an image (e.g., pixel shift technology) has been used in place of fixing an image in a specific region. For example, and referring to FIG. 1A, the display device may move an image (e.g., a predetermined image) 20 displayed in an image display region 10 according to a movement path (e.g., a predetermined movement path). In addition, the portion of the image display region 10 that does not include the image 20 may be displayed in black.

When using pixel shift technology, the period of time for which the same data is outputted to a specific pixel is reduced so that deterioration of the specific pixel may be reduced. However, referring to FIG. 1B, according to conventional pixel shift technology, the image 20 may be moved without weighting (e.g., without varying the display time of the image 20 at each position included in the movement path). In FIG. 1B, an x-axis and a y-axis may indicate a region of the image display region 10 in which the image 20 exists, and a z-axis may indicate a weighted value at each corresponding position.

Considering an accumulated image 30 during a period of time (e.g., a predetermined period of time) illustrated in FIG. 1C, there may be formed regions V1, V2, V3 and V4 in which a grayscale is dramatically changed, and portions corresponding to the regions V1, V2, V3 and V4 may be recognized by the user as image sticking.

SUMMARY

Embodiments of the present invention relate to a display device capable of reducing a phenomenon of image sticking by giving a weighted value depending on a position of an image, and a method for displaying an image thereon.

Embodiments of the present invention also relate to a method for displaying an image, the method including moving the image displayed on an image display region along a movement path including a first position and a second position during a period of time, wherein, during the period of time, a total time for which the image is located at the first position is greater than a total time for which the image is located at the second position.

The second position may be located at a greater distance from a center point of the image display region than the first position.

The image may stay at the first position for a first individual time, and may stay at the second position for a second individual time that is less than the first individual time.

During the period of time, a number of times for which the image is located at the first position may be greater than a number of times for which the image is located at the second position.

The image may stay at the first position for a first individual time, and may stay at the second position for a second individual time that is the same as the first individual time.

The movement path may include an initial position, a final position, and a plurality of intermediate positions including the first position and the second position between the initial position and the final position on the movement path.

The image may reciprocate along the movement path from the initial position to the final position.

The intermediate positions may further include a first intermediate position and a second intermediate position, and the image may reciprocate along the movement path from the initial position to the second intermediate position after reciprocating along the movement path from the initial position to the first intermediate position.

The second intermediate position may be located at a greater distance from a center point of the image display region than the first intermediate position.

The second intermediate position may be located at a shorter distance from a center point of the image display region than the first intermediate position.

The movement path may include a shape spiraling around the initial position.

Embodiments of the present invention also relate to a method for displaying an image on a display device, the method including moving the image displayed on an image display region along a movement path including a first position and a second position during a period of time, wherein the second position is located at a greater distance from a center point of the image display region than the first position, wherein the image located at the first position is given a weighted value that is higher than a weighted value given to the image located at the second position, and wherein the weighted value corresponds to individual time for which the image is located at the first position and the second position, respectively, or a number of times for which the image is located at the first position and the second position during the period of time.

Embodiments of the present invention also relate to a display device, the display device including a display panel including an image display region in which a plurality of pixels are located, a display driver for displaying an image on the image display region, and a movement path provider for providing a movement path including a first position and a second position to the display driver, wherein the display driver is configured to move an image displayed in the image display region along the movement path during a period of time, and wherein a total time for which the image is located at the first position during the period of time is greater than a total time for which the image is located at the second position during the period of time.

The movement path provider may further include a memory for storing image movement information, and a coordinate generator for generating coordinate information for each position in the movement path with reference to the image movement information.

The image movement information may correspond to a movement direction of the image.

The second position may be located at a greater distance from a center point of the image display region than the first position.

The display driver may be configured to keep the image at the first position for a first individual time, and to keep the image at the second position for a second individual time that is less than the first individual time.

A number of times that the image is located at the first position may be greater than a number of times that the image is located at the second position during the period of time.

The display driver may be configured to keep the image at the first position for a first individual time, and to keep the image at the second position for a second individual time that is the same as the first individual time.

The movement path may include an initial position, a final position, and a plurality of intermediate positions including the first position and the second position and located between the initial position and the final position.

The display driver may be configured to reciprocate the image along the movement path from the initial position to the final position.

The intermediate positions may include a first intermediate position and a second intermediate position, and the display driver may be configured to reciprocate the image along the movement path from the initial position to the second intermediate position after reciprocating the image along the movement path from the initial position to the first intermediate position.

The second intermediate position may be located at a greater distance from a center point of the image display region than the first intermediate position.

The second intermediate position may be located at a shorter distance from a center point of the image display region than the first intermediate position.

The movement path may include a shape spiraling around the initial position.

Each of the pixels may include an organic light emitting diode.

BRIEF DESCRIPTION OF THE DRAWINGS

Example embodiments of the present invention will now be described more fully hereinafter with reference to the accompanying drawings, wherein:

FIGS. 1A to 1C illustrate conventional pixel shift technology;

FIG. 12 illustrates an embodiment of a lookup table stored in a memory of FIG. 11 in accordance with an embodiment of the present invention.

DETAILED DESCRIPTION

Figure 1A:
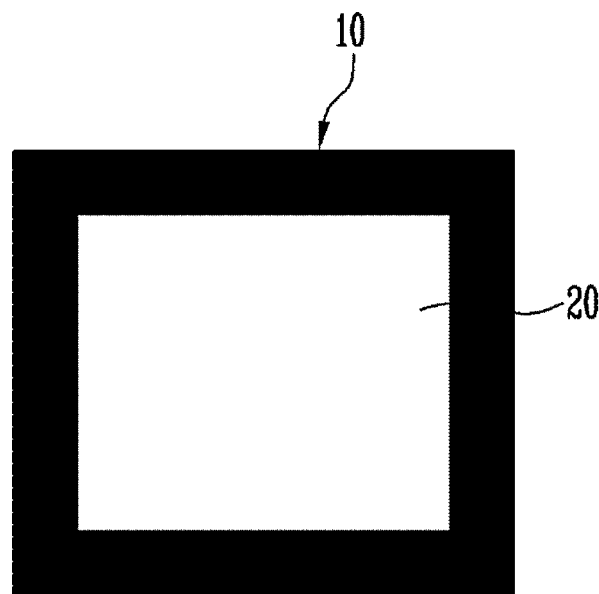
Figure 1B:
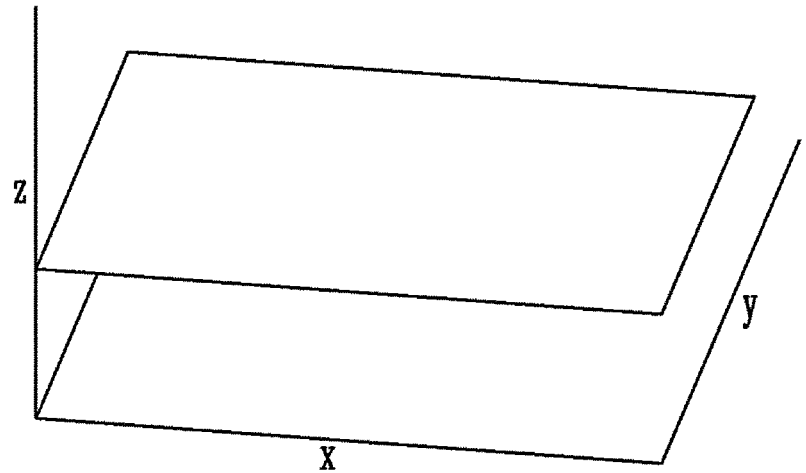

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
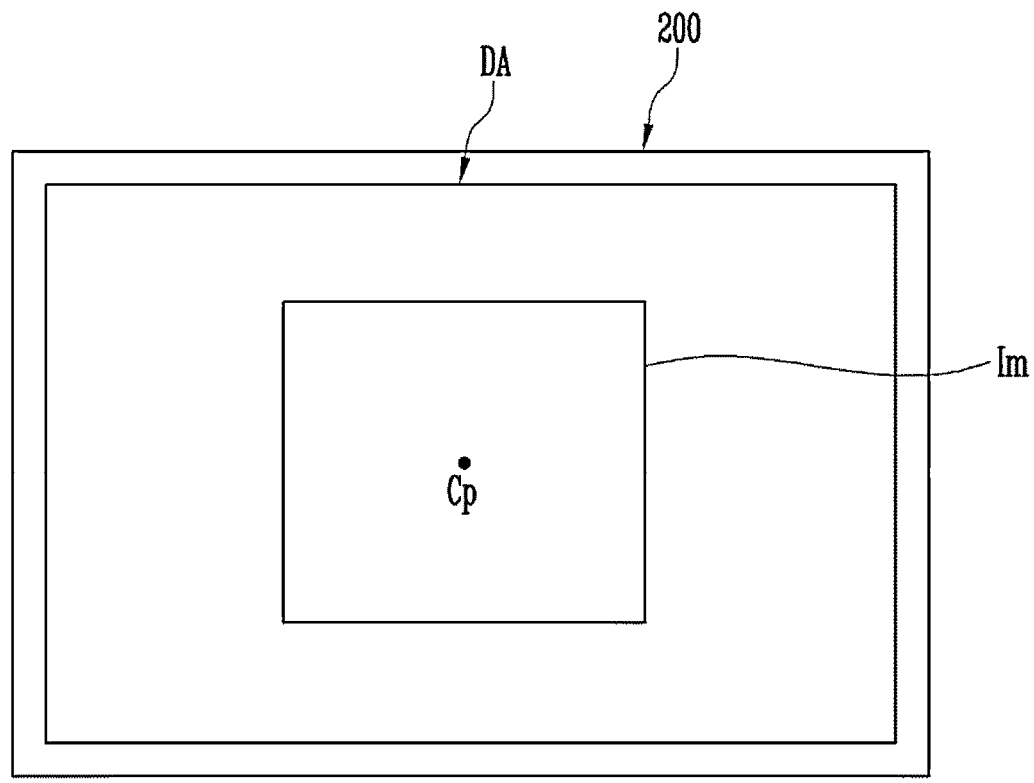
FIG. 2 illustrates an image display region of a display device in accordance with an embodiment of the present invention.
Figure 3:
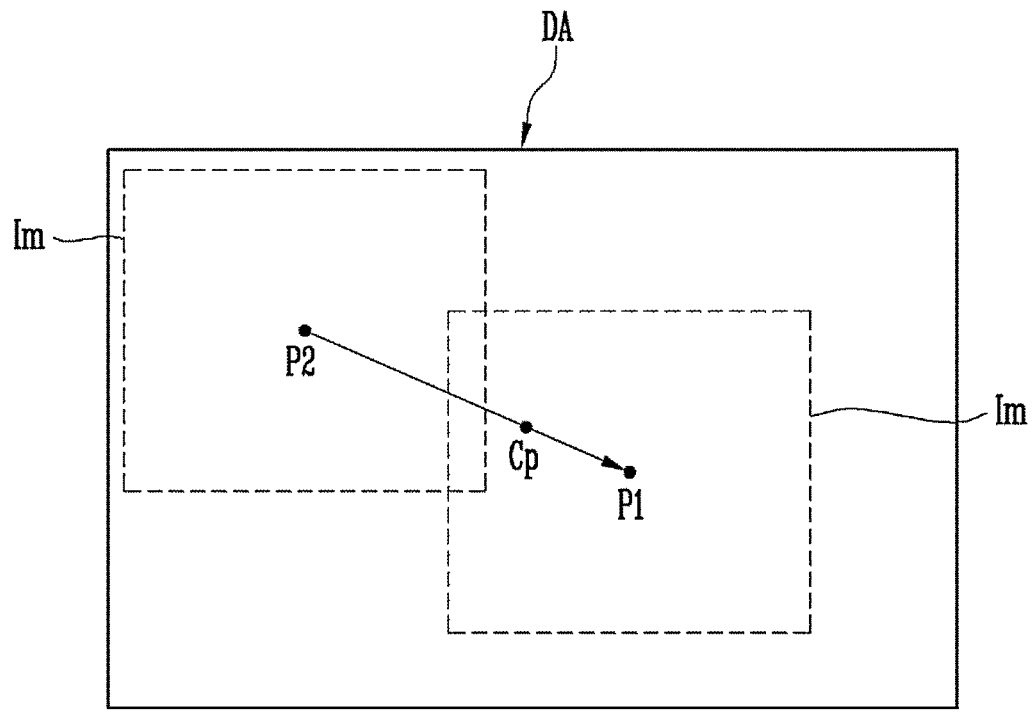
FIG. 3 illustrates a method for displaying an image in accordance with an embodiment of the present invention.

FIG. 2 illustrates an image display region of a display device in accordance with an embodiment of the present invention, and FIG. 3 illustrates a method for displaying an image in accordance with an embodiment of the present invention.

Referring to FIG. 2, a display device 200 in accordance with an embodiment of the present invention may include an image display region/display area DA that displays the image. The display device 200 may provide a user with an image Im (e.g., a predetermined image), and may display the image Im using pixels in the image display region DA. Accordingly, the user of the display device 200 may see the image Im displayed in the image display region DA.

For example, the display device 200 may be used in a television, a monitor, a mobile device, a navigation device, etc.

FIG. 2 illustrates the image Im positioned at a center point Cp of the image display region DA. As a method for displaying the image Im in accordance with an embodiment of the present invention, a pixel shift technology that displays the image Im by moving the image Im to reduce image sticking may be used. To this end, the image Im may be moved in the image display region DA according to a movement path (e.g., a predetermined movement path) during a period of time (e.g., a pixel shift period)

For example, referring to FIG. 3, when the movement path includes a first position P1 and a second position P2, the image Im may be located in the first position P1 at least once during the pixel shift period, and may be located in the second position P2 at least once during the pixel shift period.

In the method for displaying the image Im in accordance with an embodiment of the present invention, image sticking may be reduced by varying weighted values according to the position of the image Im.

For example, a first position that is closer to the center point Cp of the image display region DA may have a higher weighted value in comparison to a second position that is farther away from the center point Cp than the first location.

In addition, weighted values may be set according to the amount of time for which the image is located at each associated position during the pixel shift period.

In an example of the first position P1 and the second position P2 illustrated in FIG. 3, the weighted value associated with the first position P1, which is closer than the second position P2 to the center point Cp of the image display region DA, may be set to a higher number than the weighted value associated with the second position P2. In other words, the weighted value associated with the second position P2, which is located farther away from the center point Cp in the image display region DA than the first position P1, may be a lower number than the weighted value associated with the first position P1.

Therefore, a total amount of time for which the image Im is located at the first position P1 during the pixel shift period may be greater than a total amount of time for which the image Im is located at the second position P2.

To control the weighted value described above, in the method for displaying the image Im in accordance with an embodiment of the present invention, an individual time for which the image Im stays at each position included in the movement path may be adjusted, or the number of times for which, during the pixel shift period, the image Im stays at each position included in the movement path may be adjusted. In addition, weighted values may be controlled by these two methods (i.e., adjusting the individual time for which the image Im stays at each position, or adjusting the number of times for which the image Im stays at each position).

Figure 4A:
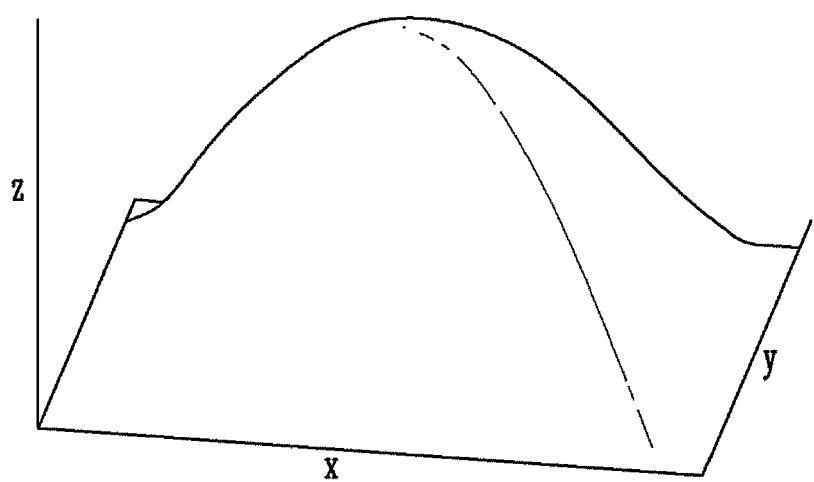
FIGS. 4A to 4D illustrate a weighting method in accordance with an embodiment of the present invention.
Figure 4B:
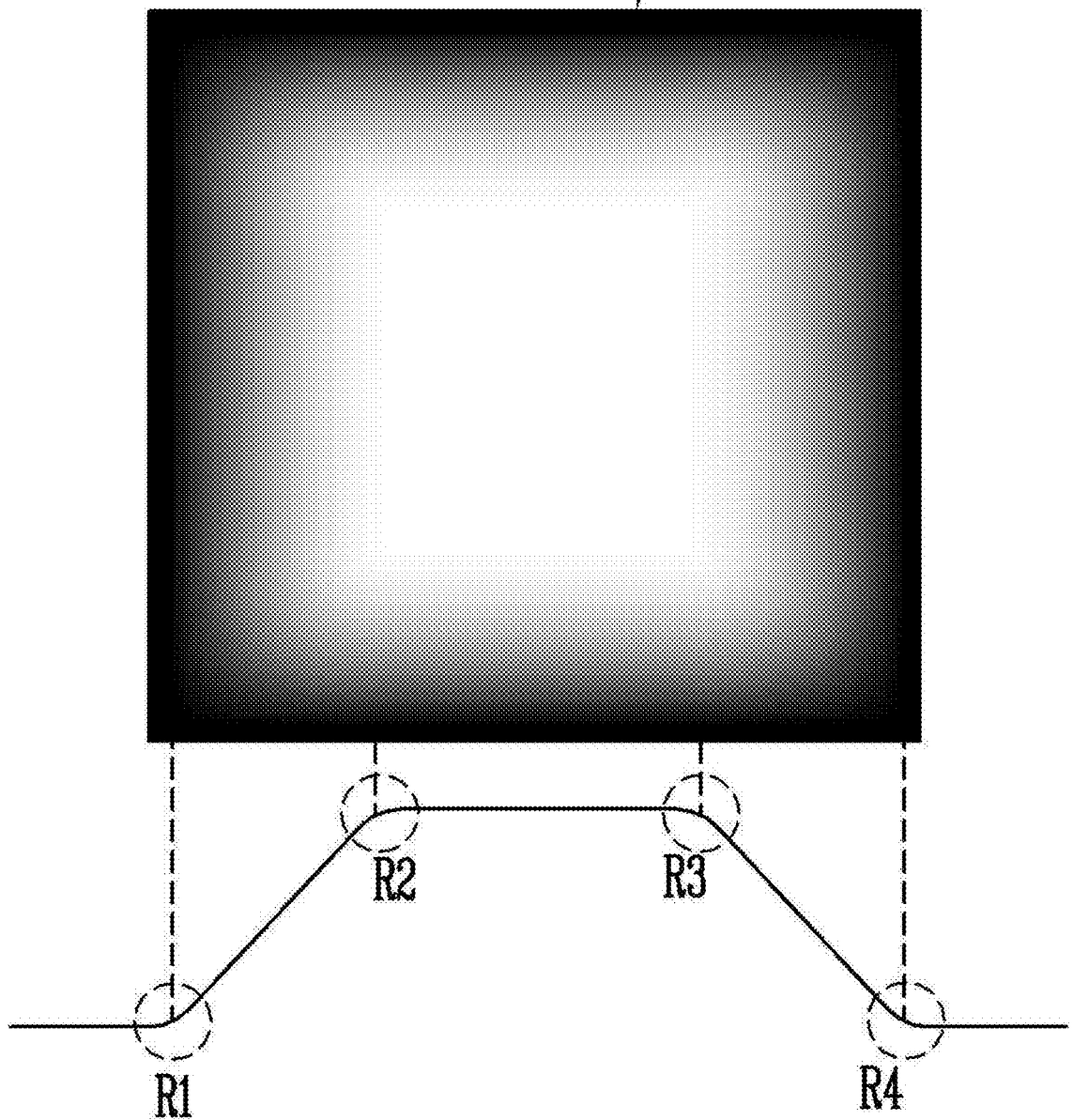

FIGS. 4A to 4D illustrate a weighting method in accordance with an embodiment of the present invention;

In FIG. 4A, the weighted values may be represented using a parabolic shape or a paraboloid, or may be represented using a curved portion of a sine wave. In addition, in FIG. 4A, an x-axis and a y-axis may show a position (e.g., a coordinate) at which the image Im is located in the image display region DA, and a z-axis may show the weighted value at each position. FIG. 4B illustrates accumulated image 310 at the image display region DA, which is generated during the period of time (e.g., the pixel shift period) when the weighted value is represented by the shape shown in FIG. 4A.

In the method for displaying the image Im, a higher, first weighted value may be associated with a center portion of the image display region DA, and weighted values associated with other positions may decrease as the distance between the positions and the center portion increases (i.e., as the image Im moves toward an outside/edge of the display region DA).

For example, the weighted value set for each position in the image display region DA may be represented together by a parabolic shape in which the center portion is represented by a curved upper portion, as illustrated in FIG. 4A.

The accumulated image 310 for the pixel shift period may be shown as illustrated in FIG. 4B, and a grayscale of the accumulated image 310 may be gradually changed (e.g., see regions R1, R2, R3 and R4). In other words, by removing a dramatic change of the grayscale generated in the conventional pixel shift technology, as illustrated in FIG. 1C, image sticking may be reduced, so that the display device may provide natural images with the user.

Figure 4C:
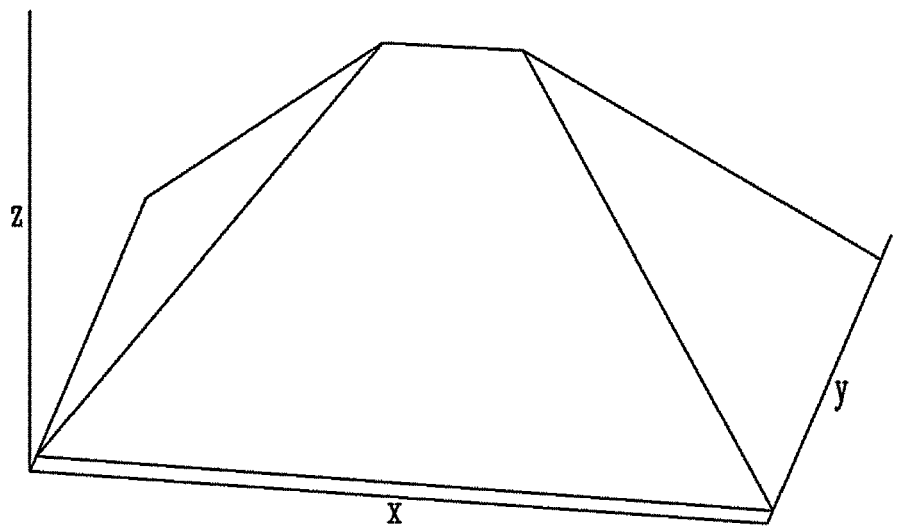

Referring to FIG. 4C, in the method for displaying the image according to another embodiment of the present invention, the weighted values associated with each position included in the image display region DA may be represented by a polygon that includes slopes (e.g., may be pyramid-shaped). In this case, the higher, first weighted value may be associated with the center portion of the image display region DA, and lower weighted values associated with other positions may decrease as the distance between a corresponding one of the other positions and the center portion increases. However, when the weighted values are represented by the shape illustrated in FIG. 4C, the weighted values may decrease (e.g., decrease linearly) as the distance between the associated position and the center portion of the image display region DA increase. That is, the weighted values may decrease as the image Im moves away from the center portion of the image display region DA.

Figure 4D:
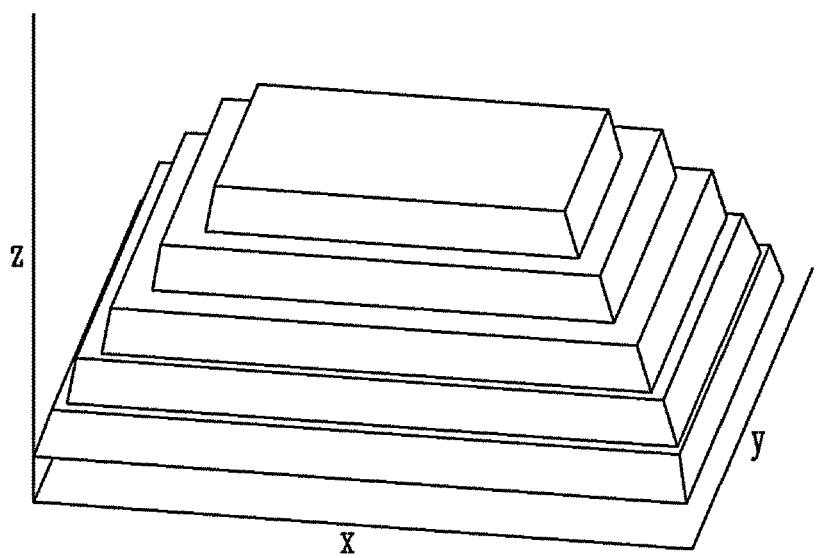

In addition, referring to FIG. 4D, in the method for displaying the image according to another embodiment of the present invention, the weighted values associated with each of the positions in the image display region DA may be represented as a shape having steps/stair-like formations. In this case, discontinuity of the weighted values may be more distinct in comparison with the weighted values illustrated in FIGS. 4A and 4C. That is, discontinuity of the weighted values may be higher in FIG. 4D than in FIGS. 4A and 4C.

Three weighting methods are described above as examples, but the weighting method may vary in other embodiments. In other words, and in contrast to the examples of FIGS. 4A-4D, another weighting method may associate increasing weighted values as the distance between the position and the center portion of the image display region DA increases (e.g., as the image Im is farther away from the center portion of the image display region DA) may be employed as the method for displaying the image in accordance with an embodiment of the present invention.

Figure 5:
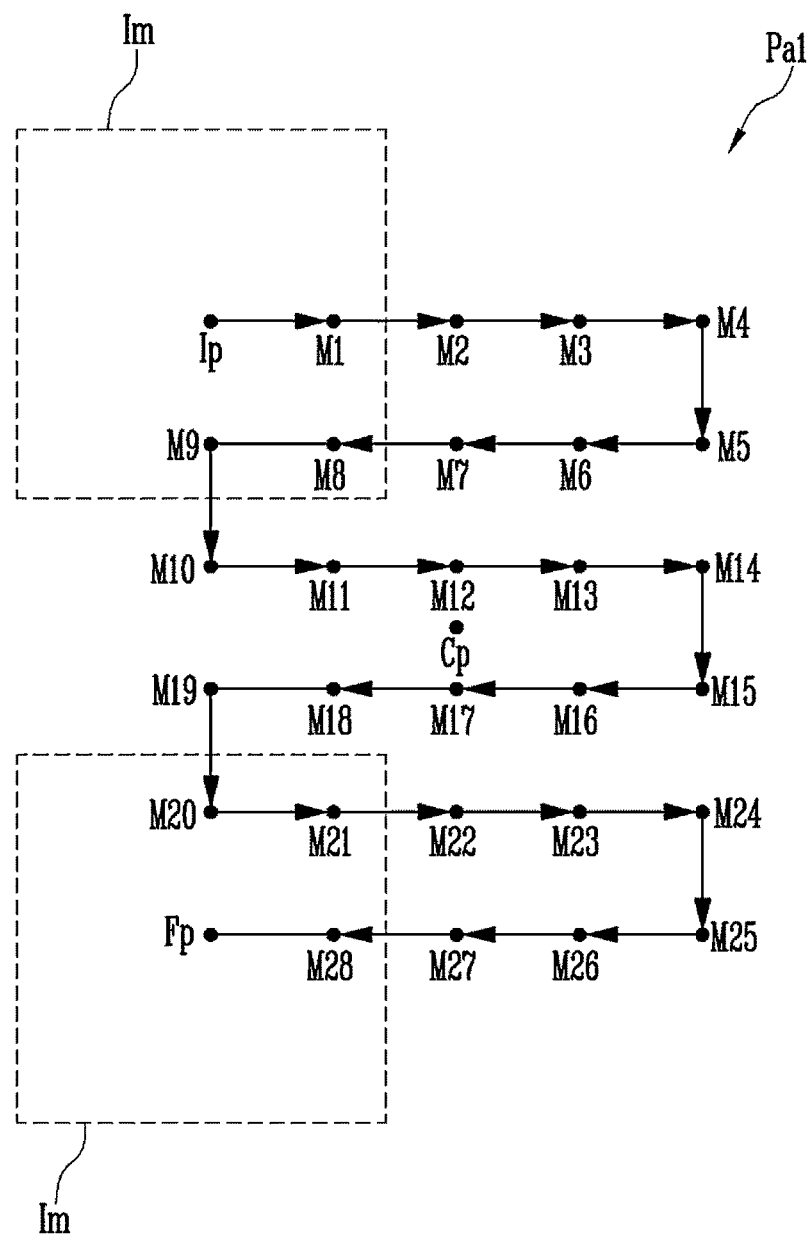
FIG. 5 illustrates a movement path of an image in accordance with an embodiment of the present invention.

FIG. 5 illustrates a movement path of an image Im in accordance with an embodiment of the present invention. To better illustrate the movement path, illustrated as an example in FIG. 5 is the image Im (e.g., a center of the image Im) located at an initial position Ip and the image Im located at a final position Fp.

Referring to FIG. 5, a movement path Pa1 in accordance with an embodiment of the present invention may be represented by a zigzag-like shape. Accordingly, in the method for displaying the image in accordance with the present embodiment, the image Im may move along the movement path Pa1 illustrated in FIG. 5 during a period of time (e.g., the pixel shift time).

For example, the image Im may move along the movement path Pa1 from a first side (e.g., an upper side) to another side (e.g., a lower side) while travelling from left to right and from right to left. The movement path Pa1 may include the initial position Ip, the final position Fp, and a plurality of intermediate positions M1 to M28 located between the initial position Ip and the final position Fp on the movement path Pa1. Accordingly, the image Im may move from the initial position Ip to the final position Fp through the intermediate positions M1 to M28.

The image Im may also move from the final position Fp to the initial position Ip through the intermediate positions M1 to M28. In other words, the image Im may repeatedly move between the initial position Ip and the final position Fp along the movement path Pa1 during the pixel shift period.

To vary the weighted value associated with each position included in the movement path Pa1, an individual time for which the image Im stays at each position included in the movement path Pa1 may be adjusted.

Using a second intermediate position M2, a seventh intermediate position M7, and a twelfth intermediate position M12 as an example, the image Im may stay at the second intermediate position M2 for a time A, may stay at the seventh intermediate position M7 for a time B, and may stay at the twelfth intermediate position M12 for a time C.

Because respective distances between the center point Cp of the image display region DA and each of intermediate position M2, M7 and M12 may become smaller according to an order of the second intermediate position M2, the seventh intermediate position M7, and the twelfth position M12, a relation of magnitude among the time A, the time B and the time C may be expressed as follows.

time A<time B<time C

For example, when the image Im moves along the movement path Pa1 four times (e.g., reciprocates along the movement path Pa1 twice) during the pixel shift period, the image Im may be located at each of the intermediate positions M2, M7, and M12 four times. Accordingly, a total amount of time for which the image Im is located at the second intermediate position M2 during the pixel shift period may be represented as a time 4A (e.g., four times time A). Similarly, a total amount of time for which the image Im is located at the seventh intermediate position M7 and at the twelfth intermediate position M12 during the pixel shift period may be represented as a time 4B and a time 4C, respectively.

In summary, the weighted values may vary according to the position of the image Im by adjusting the individual time for which the image Im stays at each position.

As an example, the movement path Pa1 illustrated in FIG. 5 does not cross the center point Cp of the image display region DA (e.g., the center point Cp is out of the movement path Pa1 as an example). However, in other embodiments, the center point Cp of the image display region DA may be located on/within the movement path Pa1. For example, the center point Cp of the image display region DA may be located at, or may be consistent with, one of the intermediate positions M1 to M28.

In addition, although FIG. 5 illustrates twenty-eight intermediate positions (e.g., intermediate positions M1 to M28) as an example, the number of intermediate positions may vary (e.g., may vary depending on a length of the movement path Pa1).

In other embodiments, the image Im may move a distance of one pixel at a time. For example, when an amount of movement of the image Im is set to one pixel, the image Im located at the initial position Ip may move to the first intermediate position M1 by moving the image Im one pixel to the right.

Figure 6:
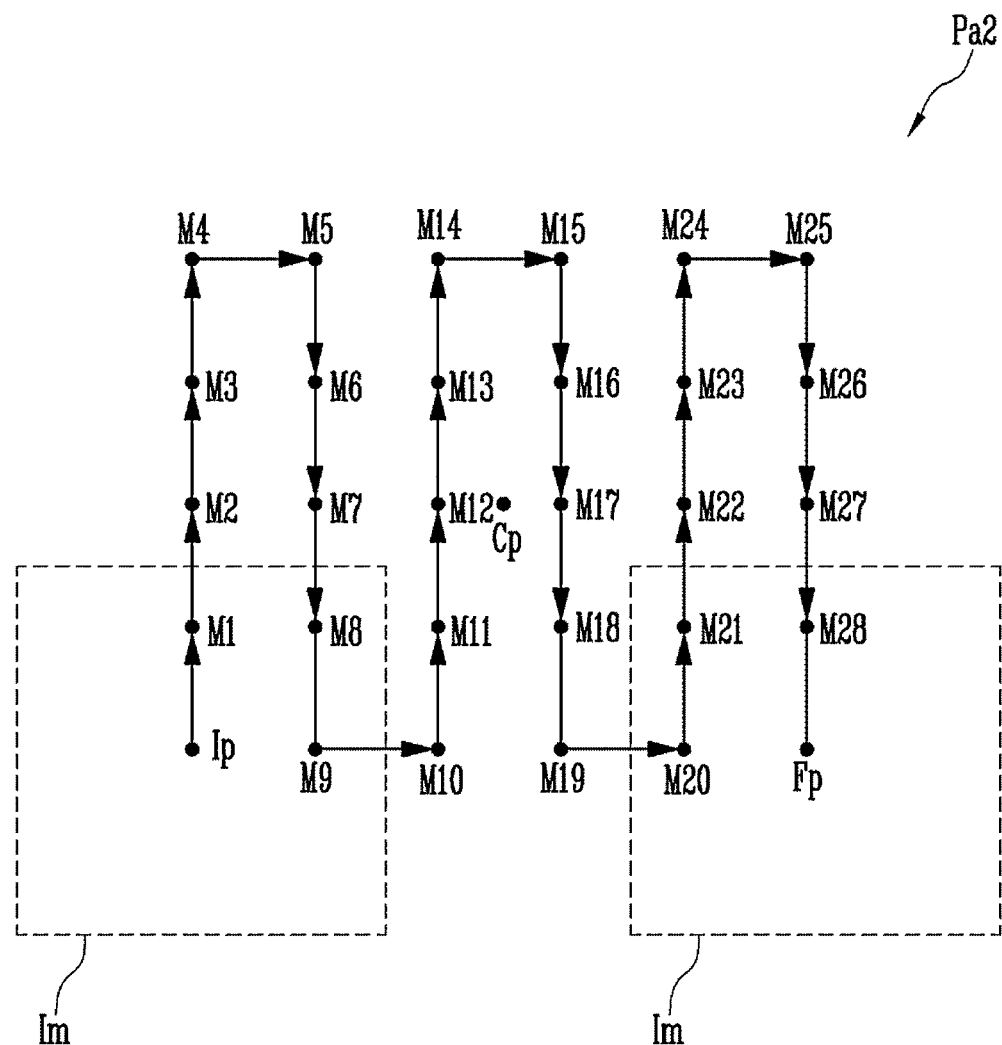
FIG. 6 illustrates a movement path of an image in accordance with another embodiment of the present invention.

FIG. 6 illustrates a movement path of an image in accordance with another embodiment of the present invention. To better illustrate the movement path, illustrated as an example in FIG. 6 is the image Im (e.g., the center of the image Im) located at the initial position Ip and the image Im located at the final position Fp.

Referring to FIG. 6, a movement path Pa2 in accordance with another embodiment of the present invention may be represented by a zigzag-like shape. The movement path Pa2 illustrated in FIG. 6 may be represented by the same shape used to represent the movement path Pa1 illustrated in FIG. 5, although the same shape is rotated 90 degrees. In this case, the image Im may move along the movement path Pa2 from one side (e.g., a left side) to another side (e.g., a right side) by moving up and down.

Because the movement of the image Im is similar to that of FIG. 5, a detailed description pertaining to FIG. 6 is omitted.

Figure 7:
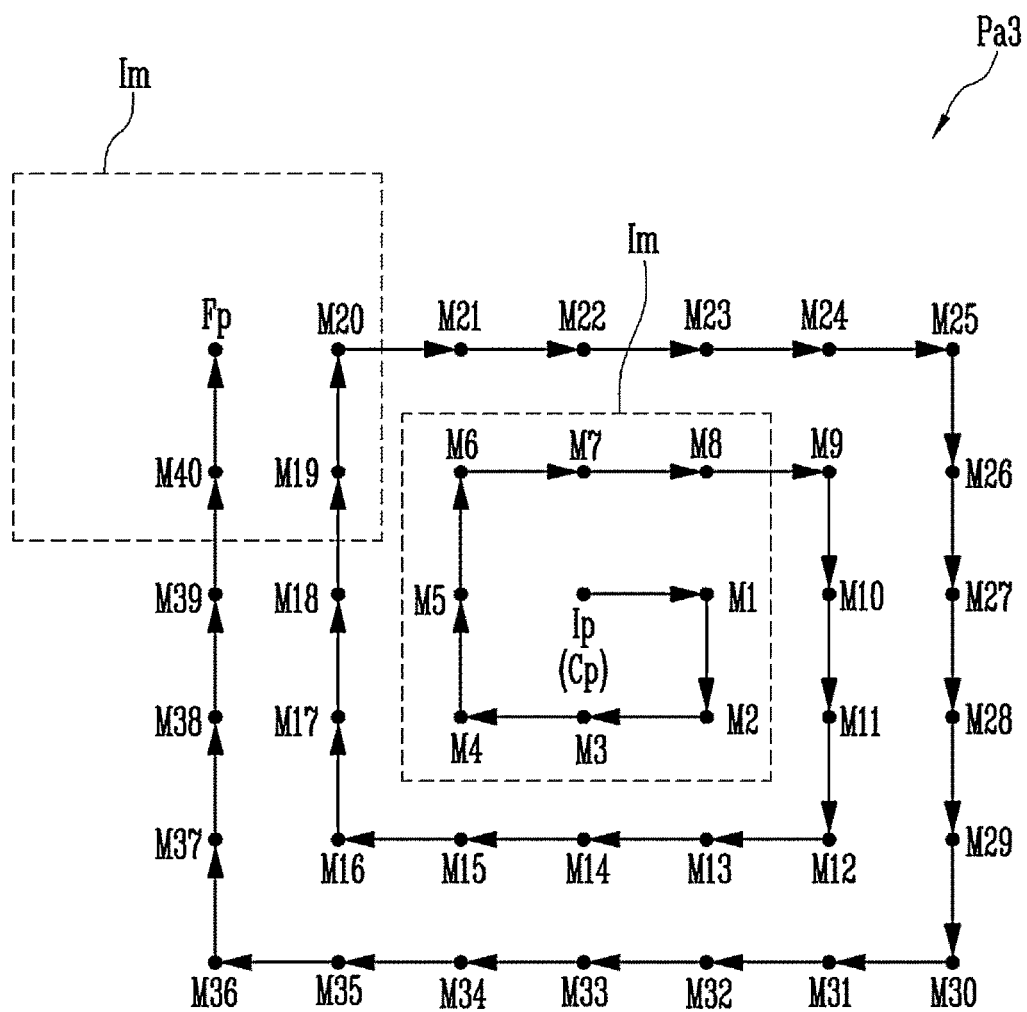
FIG. 7 illustrates a movement path of an image in accordance with yet another embodiment of the present invention.

FIG. 7 illustrates a movement path of an image Im in accordance with yet another embodiment of the present invention. To better illustrate the movement path, illustrated as an example in FIG. 7 is the image Im (e.g., the center of the image Im) located at the initial position Ip and the image Im located at the final position Fp.

Referring to FIG. 7, a movement path Pa3 in accordance with another embodiment of the present invention may be represented by a spiral-like shape around the initial position Ip.

For example, the movement path Pa3 may include a spiral shape spiraling away from the center position Cp of the image display region DA. The movement path Pa3 may include the initial position Ip, the final position Fp, and a plurality of intermediate positions M1 to M40 arranged between the initial position Ip and the final position Fp on the movement path Pa3. The initial position Ip may be located at the center point Cp of the image display region DA.

For example, the image Im may repeatedly move between the initial position Ip and the final position Fp along the movement path Pa3 during the pixel shift period. In other words, the image Im may move from the initial position Ip to the final position Fp through the intermediate positions M1 to M40, and may move back to the initial position Ip through the intermediate positions M40 to M1.

To vary the weighted value associated with each position included in the movement path Pa3, an individual time for which the image Im stays at each position included in the movement path Pa3 may be adjusted.

Using a fifth intermediate position M5, an eighteenth intermediate position M18, and a thirty-ninth intermediate position M39 as an example, the image Im may stay at the fifth intermediate position M5 for a time E, may stay at the eighteenth intermediate position M18 for a time F, and may stay at the thirty-ninth intermediate position M39 for a time G.

Because respective distances between each intermediate position M5, M18, and M39 and the center point Cp of the image display region DA may become smaller according to an order of the fifth intermediate position M5, the eighteenth intermediate position M18, and the thirty ninth position M39, a relation of magnitude among the time E, the time F and the time G may be expressed as follows.

time E>time F>time G

For example, when the image Im moves along the movement path Pa3 four times (e.g., reciprocates along the movement path Pa3 twice) during the pixel shift period, the image Im may be located at each intermediate position M5, M18, and M39 four times. Accordingly, a total amount of time for which the image Im is located at the fifth intermediate position M5 during the pixel shift period may be represented as a time 4E (i.e., four times the time E). In addition, a total amount of time for which the image Im is located at the eighteenth intermediate position M18 and at the thirty-ninth intermediate position M39 during the pixel shift period may be represented as a time 4F and a time 4G, respectively.

In summary, the weighted values may vary according to the position of the image Im by adjusting the individual time for which the image Im stays at each position.

In other embodiments, the weighted value may be adjusted by a method using a portion of the movement path Pa3 during the pixel shift period instead of a method in which the image Im repeatedly moves between the initial position Ip and the final position Fp along the movement path Pa3.

For example, after the image moves from the initial position Ip to the final position Fp and moves back to the initial position Ip along the movement path Pa3, the image may move from the initial position Ip to the twentieth intermediate position M20 and may then move back to the initial position Ip along the movement path Pa3. After that, the image may move from the initial position Ip to the sixth intermediate position M6, and may move back to the initial position Ip along the movement path Pa3.

In this case, the number of positions at which the image Im is located may differ depending on the number of positions included in the movement path Pa3. For example the image may be located at the fifth intermediate position M5 three times, at the eighteenth intermediate position M18 twice, and at the thirty-ninth intermediate position M39 once during the pixel shift period.

Accordingly, although an individual period of time for which the image Im is located at each of intermediate position M5, M18, and M39 are the same, a total amount of time for which the image Im is located at each of intermediate position M5, M18 and M39 during the pixel shift period may be different.

That is, a total amount of time for which the image Im is located at the fifth intermediate position M5, which is closer to the center point Cp of the image display region DA than intermediate positions M18 and M39, may be larger than the total amount of time for which the image Im is located at each of intermediate positions M18 and M39. Further, a total amount of time for which the image Im is located at the thirty-ninth intermediate position M39, which is farther from the center point Cp of the image display region DA than intermediate positions M5 and M18, may be less than the total amount of time for which the image Im is located at each of intermediate positions M5 and M18.

As a result, weighted values may vary according to the position of the image Im by adjusting the number of positions included in the movement path Pa3 at which the image Im is located.

In the example described above, the image Im may move from the initial position Ip to the final position Fp, and may then move back to the initial position Ip along the movement path Pa3, although movement of the image Im may vary.

For example, after the image Im moves from the initial position Ip to the sixth intermediate position M6, and then back to the initial position Ip, along the movement path Pa3, the image Im may then move from the initial position Ip to the twentieth intermediate position M20, and then back to the initial position Ip along the movement path Pa3. After that, by moving the image Im from the initial position Ip to the final position Fp along the movement path Pa3, and the same effects as described in the above example may be generated.

Although FIGS. 5 to 7 illustrate various movement paths Pa1, Pa2, and Pa3 as examples, the movement path of the image Im may be varied.

In addition, in the previously described examples, a method of controlling a weighted value by adjusting an individual time for which the image Im is located at each position, and a method of controlling a weighted value by adjusting the number of times for which the image Im is located at each position, are described separately, although the two methods may be used together in other embodiments.

Figure 8:
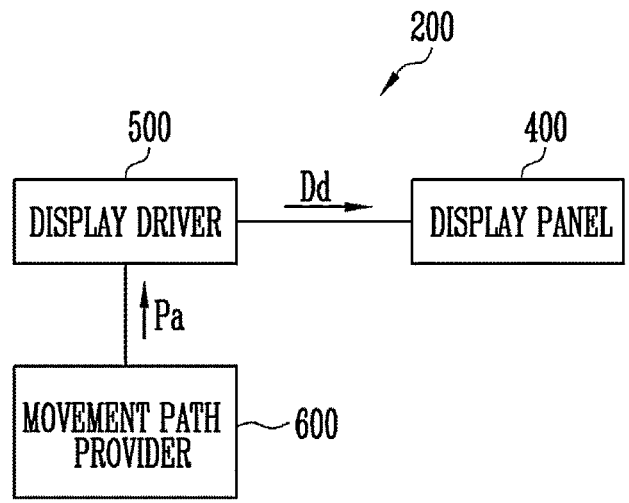
FIG. 8 illustrates a display device in accordance with an embodiment of the present invention.

FIG. 8 illustrates a display device in accordance with an embodiment of the present invention;

Referring to FIG. 8, the display device 200 in accordance with an embodiment of the present invention may include a display panel 400, a display driver 500, and a movement path provider 600.

Figure 9:
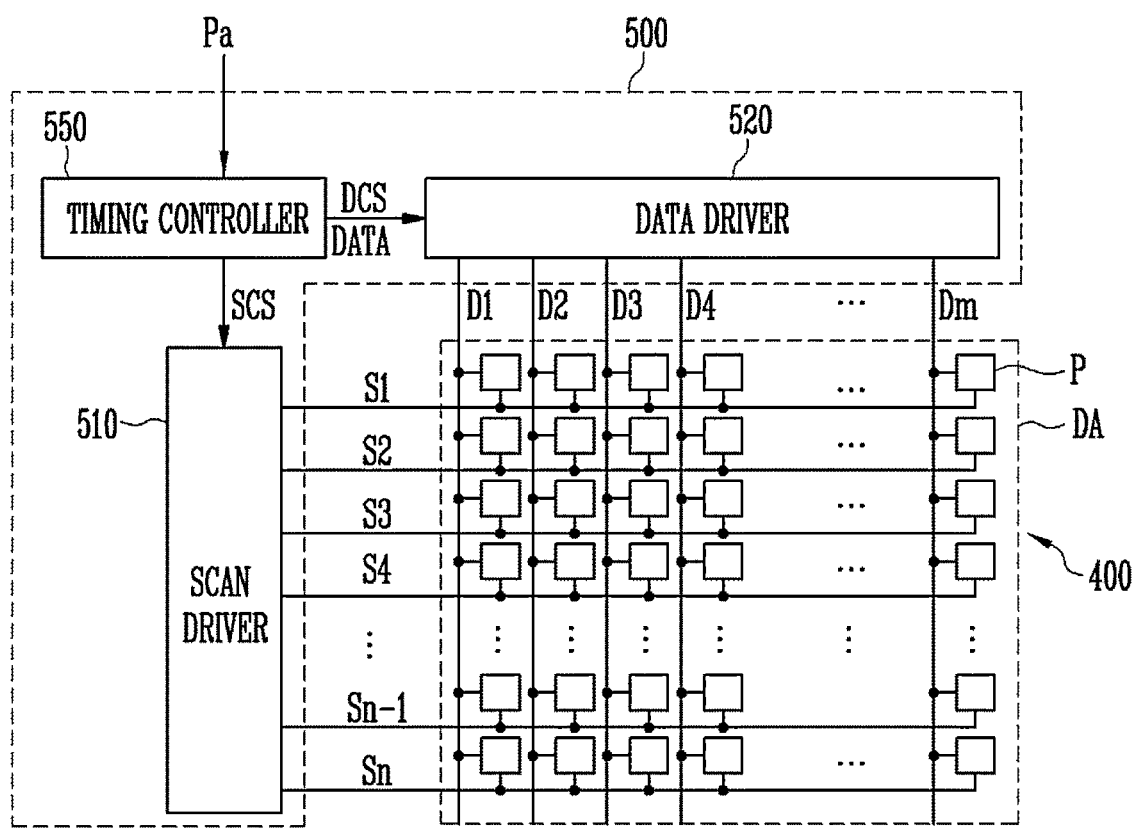
FIG. 9 illustrates a display driving unit (e.g., a display driver) and a display panel in accordance with an embodiment of the present invention.

The display panel 400 may include a plurality of pixels P (as shown in FIG. 9), to thereby display an image (e.g., a predetermined image). In addition, the display panel 400 may include an image display region/display area DA (as shown in FIG. 9) in which the plurality of pixels P are located. Accordingly, the display panel 400 may display the image at the image display region DA according to control information provided by the display driver 500. Furthermore, the display panel 400 may be embodied by an organic light emitting display panel, but the display panel 400 is not limited thereto.

The display driver 500 may control an image display operation of the display panel 400 by supplying a driving signal Dd to the display panel 400. For example, the display driver 500 may move an image displayed at the image display region DA of the display panel 400 along the movement path Pa provided from the movement path provider 600 for a period of time (e.g., a pixel shift period). In addition, the display driver 500 may increase the reduction of image sticking by setting the weighted values according to the position included in the movement path Pa. Because a method of setting the weighted value is already described in detail above, the description will be omitted.

The movement path provider 600 may provide the movement path Pa of the image to the display driver 500. For example, the movement path Pa may include coordinate information of the positions constituting a path Pa. The movement path provider 600 may be separated from the display driver 500 as described in FIG. 8. However, in another embodiment of the present invention, the movement path provider 600 may be integrated with the display driver 500.

FIG. 9 illustrates a display driving unit (e.g., the display driver) and a display panel in accordance with an embodiment of the present invention.

Referring to FIG. 9, the display panel 400 in accordance with an embodiment of the present invention may include a plurality of data lines D1 to Dm, a plurality of scan lines S1 to Sn, and a plurality of pixels P.

The pixels P may be connected to the data lines D1 to Dm and the scan lines S1 to Sn. For example, the pixels P may be arranged at respective crossing regions of the data lines D1 to Dm and the scan lines S1 to Sn in a matrix configuration. In addition, each pixel P may receive a data signal and a scan signal through respective ones of the data lines D1 to Dm and the scan lines S1 to Sn.

The display driver 500 may include a scan driver 510, a data driver 520 and a timing controller 550. In addition, the driving signal Dd of the display driver 500 may include the scan signal and the data signal.

The scan driver 510 may supply the scan signals to the scan lines S1 to Sn corresponding to a scan driver control signal SCS. For example, the scan driver 510 may sequentially provide the scan signals to the scan lines S1 to Sn. The scan driver 510 may be electrically connected to the scan lines S1 to Sn located at the display panel 400 through a separate component (e.g., a circuit board). In another embodiment, the scan driver 510 may be directly mounted in the display panel 400.

The data driver 520 may receive a data driver control signal DCS and image data DATA from the timing controller 550, and may generate the data signal. The data driver 520 may supply a generated signal to the data lines D1 to Dm. The data driver 520 may be electrically connected to the data lines D1 to Dm located in the display panel 400 through a separate component (e.g., a circuit substrate). In another embodiment, the data driver 520 may be directly mounted in the display panel 400.

When the scan signal is supplied to a specific scan line, a partial group of pixels P connected to a specific scan line may receive the data signal transmitted from the data lines D1 to Dm, and the group of pixels P may emit light with the brightness corresponding to the supplied data signal.

The timing controller 550 may generate control signals to control the scan driver 510 and the data driver 520. For example, the control signals may include the scan driver control signal SCS to control the scan driver 510, and may include the data driver control signal DSC to control the data driver 520. In addition, the timing controller 550 may supply the scan driver control signal SCS to the scan driver 510, and may supply the data driver control signal DSC to the data driver 520.

The timing controller 550 may convert the data DATA according to specifications of the data driver 520, and may supply the data DATA to the data driver 520. In addition, the timing controller 550 may control the scan driver 510 and the data driver 520 so that the image displayed in the image display region DA may move along the movement path Pa supplied from the movement path provider 600.

Figure 10:
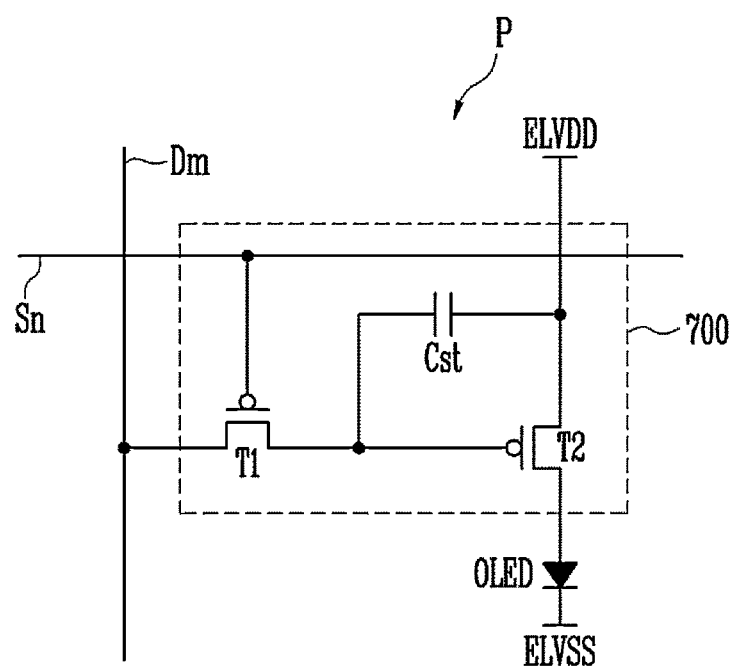
FIG. 10 illustrates an embodiment of a pixel illustrated in FIG. 9.

FIG. 10 illustrates an embodiment of a pixel illustrated in FIG. 9. For convenience, FIG. 10 illustrates a pixel P connected to an $n^{th}$ scan line Sn and an $m^{th}$ data line Dm.

Referring to FIG. 10, the pixel P may include an organic light emitting diode (OLED) and a pixel circuit 700 connected to the data line Dm and the scan line Sn to control the OLED.

An anode electrode of the OLED may be connected to the pixel circuit 700, and a cathode electrode of the OLED may be connected to a second power ELVSS. The OLED may generate light (e.g., light of a predetermined luminance) corresponding to a current supplied from the pixel circuit 700.

The pixel circuit 700 may store the data signal supplied to an mth data line Dm when the scan signal is supplied to an nth scan line Sn, and may control current volume supplied to the OLED corresponding to the stored data signal.

For example, the pixel circuit 700 may include a first transistor T1, a second transistor T2, and a storage capacitor Cst. The first transistor T1 may be connected between the mth data line Dm and the second transistor T2. For example, a gate electrode of the first transistor T1 may be connected to an nth scan line Sn, a first electrode of the first transistor T1 may be connected to an mth data line Dm, and a second electrode of the first transistor T1 may be connected to a gate electrode of the second transistor T2.

The first transistor T1 may turn on when the scan signal is supplied from the nth scan line Sn, and may supply the data signal from the mth data line Dm to the storage capacitor Cst. The storage capacitor Cst may charge a voltage corresponding to the data signal.

The second transistor T2 may be connected between a first power ELVDD and the OLED. For example, the gate electrode of the second transistor T2 may be connected to the first electrode of the storage capacitor Cst and to the second electrode of the first transistor T1, the first electrode of the second transistor T2 may be connected to the second electrode of the storage capacitor Cst and to the first power ELVDD, and the second electrode of the second transistor T2 may be connected to the anode electrode of the OLED.

The second transistor T2 may, as a driving transistor, control the current volume flowing from the first power ELVDD to the second power ELVSS via the OLED corresponding to a voltage value stored in the storage capacitor Cst. The OLED may generate the light corresponding to the current volume supplied from the second transistor T2.

The first electrode of the transistors T1 and T2 may be set as one of the source electrode and the drain electrode, and the second electrode of the transistors T1 and T2 may be set to a different electrode from the first electrode. For example, when the first electrode is the source electrode, the second electrode may be the drain electrode.

Because a pixel structure of FIG. 10 described above is an example of an embodiment of the present invention, the pixel P of the present invention is not limited to the pixel structure. In practice, the pixel circuit 700 has a circuit structure that supplies the current to the OLED, and the pixel circuit 700 may be selected as any one of a variety of suitable structures.

Figure 11:
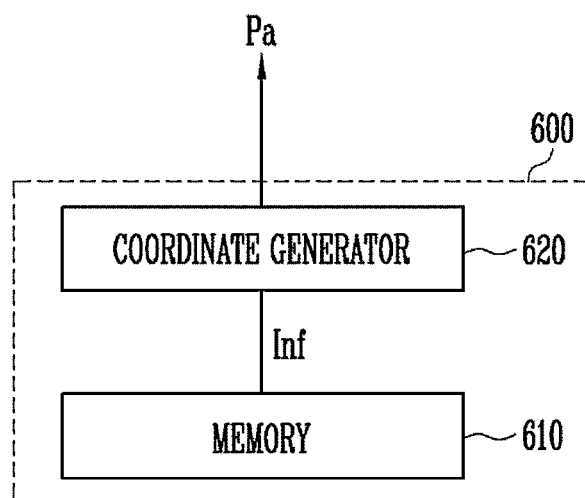
FIG. 11 illustrates a movement path provider in accordance with an embodiment of the present invention.
Figure 12:
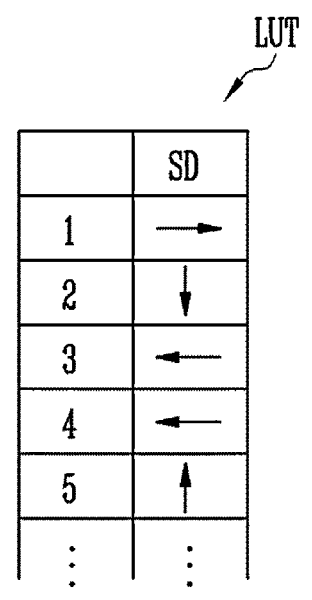

FIG. 11 illustrates a movement path provider in accordance with an embodiment of the present invention. FIG. 12 illustrates an embodiment of a lookup table stored in a memory in FIG. 11 in accordance with an embodiment of the present invention.

Referring to FIG. 11, the movement path provider 600 in accordance with an embodiment of the present invention may include a memory 610 and a coordinate generator 620.

The memory 610 may store image movement information Inf. For example, the image movement information Inf may include a movement direction SD. For example, the memory 610 may include the image movement information Inf in a lookup table LUT configuration illustrated in FIG. 12. In this case, the look-up table LUT may include an up, a down, a left, and a right movement direction SD.

The coordinate generator 620 may generate the movement path Pa with reference to the image movement information Inf stored in the memory 610. The movement path Pa may include the coordinate information indicating the position.

In an example of the case in which the image moves along the movement path Pa3 of FIG. 7 described above, an operation of the display device 200 in accordance with an embodiment of the present invention will be described.

First, by the display driver 500, an image Im (e.g., a predetermined image) may be displayed at the initial position Ip in the image display area DA.

The coordinate generator 620 may sequentially refer to the movement direction SD from the image movement information Inf stored in the memory 610. For example, because a first movement direction of the image movement information Inf is a right movement direction, the coordinate generator 620 may calculate the coordinate (1, 0) indicating the first intermediate position M1 (e.g., the coordinate of the initial position Ip is assumed to be (0, 0)).

In addition, in the coordinate generator 620, because a second movement direction of the image movement information Inf is to a lower position (e.g., a down movement direction), the coordinate generator 620 may calculate the coordinate (1, −1) indicating the second intermediate position M2. In the same way, the coordinate generator 620 may sequentially calculate the coordinates/coordinate points indicating the remaining intermediate positions M3 to M40 and the final position Fp.

The coordinates calculated by the coordinate generator 620 may constitute the movement path Pa, and may be delivered to the display driver 500. When the display driver

500 receives the coordinate (1, 0) from the coordinate generator 620, the image Im displayed at the initial position Ip may move to the first intermediate position M1.

In addition, when the display driver 500 receives the coordinate (1, −1) from the coordinate generator 620, the image Im illustrated at the first intermediate position M1 may move to the second intermediate position M2. In the same manner, the display driver 500 may move the image Im along the movement path Pa3 during the pixel shift period.

When the coordinate generator 620 continuously outputs the same coordinate, or when the coordinate generator 620 does not output the coordinate, the display driver 500 may maintain the current position of the image Im.

As described above, an individual time for which the image Im stays at a particular position may be adjusted.

As described, in accordance with an embodiment, the present invention may provide a display device that reduces image sticking by varying a weighted value according to a position of an image and a method for displaying an image thereof.

Embodiments are provided to more sincerely and fully disclose the invention and to completely transfer the spirit of the invention to those skilled in the art to which the invention pertains, and the scope of the invention should be understood by the claims of the invention. Accordingly, it will be understood by those of skill in the art that various changes in form and details may be made without departing from the spirit and scope of the invention as set forth in the following claims. Accordingly, it will be understood by those of skill in the art that various changes in form and details may be made without departing from the spirit and scope of the present invention as set forth in the following claims. Therefore, the technical range of the present invention is not limited to the detailed description of the specification but defined by the range of the claims and their functional equivalents.

What is claimed is:

1. A method for reducing or preventing image sticking by displaying an image on a display device, the method comprising:
    moving the image such that a pixel of the image is located at a plurality of positions from an initial position in an image display region during a period of time,
    wherein, during the period of time, the moving the image comprises:
    moving the pixel of the image to a first position of the plurality of positions from the initial position in a first amount of time;
    moving the pixel of the image to the initial position from the first position; and
    moving the pixel of the image to a second position of the plurality of positions from the initial position in a second amount of time that is equal to the first amount of time, and
    wherein a distance between the first position and the initial position is different from a distance between the second position and the initial position.

2. The method of claim 1, wherein the distance between the second position and the initial position is greater than the distance between the first position and the initial position.

3. The method of claim 1, wherein a number of separate instances for which the pixel of the image is discontinuously located at the first position is greater than a number of separate instances for which the pixel of the image is discontinuously located at the second position.

4. The method of claim 1, wherein a reference movement path comprises the plurality of positions, and
    wherein each of the first position and the second position is a subset of the plurality of positions.

5. The method of claim 1, wherein the pixel of the image stays at the first position for a first individual time, and stays at the second position for a second individual time that is less than the first individual time.

6. The method of claim 1, wherein the pixel of the image stays at the first position for a first individual time, and stays at the second position for a second individual time that is the same as the first individual time.

7. The method of claim 1, wherein the moving the image further comprises moving the pixel of the image to the initial position from the second position.

8. A method for reducing or preventing image sticking by displaying an image on a display device, the method comprising:
    moving the image such that a pixel of the image is located at a plurality of positions from an initial position in an image display region during a period of time,
    wherein, during the period of time, the moving the image comprises:
    moving the pixel of the image to a first position of the plurality of positions from the initial position;
    moving the pixel of the image to the initial position from the first position; and
    moving the pixel of the image to a second position of the plurality of positions from the initial position,
    wherein a distance between the first position and the initial position is different from a distance between the second position and the initial position, and
    wherein an accumulated image displayed on the image display region during the period of time has a higher level grayscale value at the first position than at the second position.

9. A display device comprising:
    a display panel comprising an image display region in which a plurality of pixels are located, the plurality of pixels comprising a first pixel at a first position of the image display region and a second pixel at a second position of the image display region; and
    a display driver configured to control the display panel, during a period of time, to move an image displayed on the image display region from an initial position of the image display region to the first position in a first amount of time, to move the image from the first position to the initial position, and to move the image from the initial position to the second position in a second amount of time that is equal to the first amount of time,
    wherein a distance between the first position and the initial position is different from a distance between the second position and the initial position.

10. The display device of claim 9, wherein the distance between the second position and the initial position is greater than the distance between the first position and the initial position.

11. The display device of claim 9, wherein a number of separate instances for which the image is discontinuously located at the first position is greater than a number of separate instances for which the image is discontinuously located at the second position.

12. The display device of claim 9, further comprising a memory to store a first movement path between the initial position and the first position and a second movement path between the initial position and the second position.

13. The display device of claim 12, wherein each of the first movement path and the second movement path comprises a shape spiraling around the initial position.

14. The display device of claim 9, wherein the image stays at the first position for a first individual time, and stays at the second position for a second individual time that is less than the first individual time.

15. The display device of claim 9, wherein the display driver is further configured to control the display panel to move the image from the second position to the initial position.

* * * * *